GATED MAGNETIC RECORDING HEAD AMPLIFIER

Filed Feb. 15, 1966

INVENTOR
WESLEY R. JOHNSON
BY Thomas J. Nikolai
ATTORNEY

INVENTOR
WESLEY R. JOHNSON
BY Thomas J. Nikolai
ATTORNEY

United States Patent Office 3,438,055
Patented Apr. 8, 1969

3,438,055
GATED MAGNETIC RECORDING HEAD AMPLIFIER

Wesley R. Johnson, Minneapolis, Minn., assignor to Sperry Rand Corporation, New York, N.Y., a corporation of Delaware Filed Feb. 15, 1966, Ser. No. 527,541
Int. Cl. G01d 15/12
U.S. Cl. 346—74 7 Claims

ABSTRACT OF THE DISCLOSURE

A gated magnetic recording amplifier which provides substantially equal rise-times and fall-times for recording binary signals is described. The amplifier has an autotransformer connected across the write-head winding and gate circuit at each end thereof. A center-tap is shown coupled to a signal generator for deriving the drive pulses to the write-head winding in the appropriate leg of the autotransformer dependent upon which of the gate circuits is activated.

This invention relates to a gated magnetic recording amplifier and in particular to a device for transforming data signals into signals suitable for driving magnetic write heads so as to reproduce the data signals on a recording surface.

In early prior art systems, the write amplifier consisted of two interconnected, but essentially independent stages, each of which includes a transistor that feeds one-half of a center-tapped write-head winding through a transformer. One of said stages would be used to write a "one" and the other would be used to write a "zero." Inasmuch as only half of the windings on the head are then available for recording a given signal, twice the current is required in order to obtain the same output flux. Further, the center-tapped write-head winding complicates the circuitry for using the same head to read the recorded data.

In order to overcome these difficulties, circuits were developed which provided the required reversal in current through the magnetic write-head winding without recourse to a center-tapped winding. See Patent Nos. 3,176,156, 2,900,215, and 3,125,759. Thus, a single write-head winding was used to provide both a "0" and a "1" signal. When a first transistor was turned on, current flowed through the write-head winding in one direction. However, when the second transistor was turned on, the current flowed through the write-head winding in the other direction.

While this system alleviated the problem of the center-tapped write-head windings, a further problem remained. The characteristics of the "1" signal were determined by one transistor while the characteristics of the "0" signal were determined by the other transistor. Since the rise-times and fall-times of the transistors were nearly certain to differ, the "1" and the "0" signals would vary. This means that when a "1" is written over a "0", or vice-versa, perfect erasure did not occur; and, thus, noise was introduced into the system.

The present invention overcomes the above disadvantage by causing the rise-times and fall-times of the "0" and "1" signals to be identical by originating both signals from a common signal generator properly timed with a gating circuit. These signals are amplified by the windings of an autotransformer and presented to opposite sides of the write-head winding. The signals are nearly perfect mirror images, consequently writing one signal over the other effects a nearly perfect erasure, and minimizes noise.

Another advantage of the new design is that the input signal generator is DC coupled to the write-head winding, as opposed to AC coupling used in the prior art. Consequently, for the same magnitude of input signal, the signal seen by the write-head winding will be greater in the new design than in the prior art, i.e., the amplified signal now consists of AC and DC components whereas previously it consisted of only an AC component.

Also, when using a common winding for writing and reading, the present invention allows a balanced line to be used with a differential-reading amplifier in contrast to other schemes which require that one side of the head be grounded. Grounding one side of the head prohibits the use of balanced differential amplifiers for noise rejection.

Figure 3A:
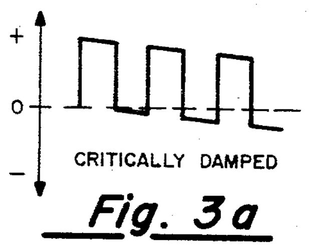
Figure 3B:
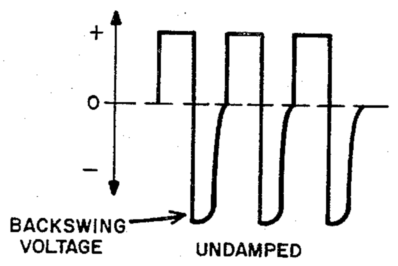
Figure 6:
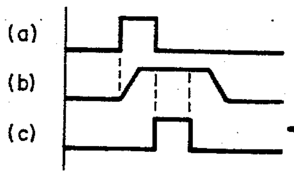
Figure 4:
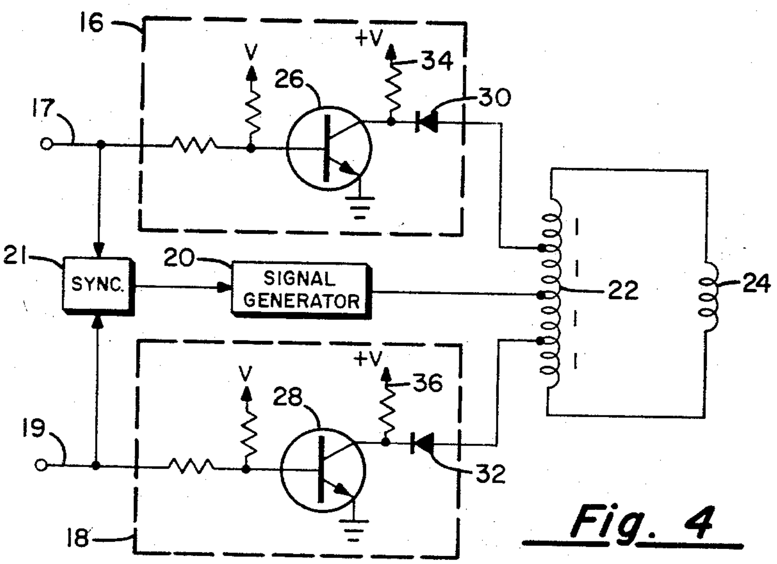
Figure 5A:
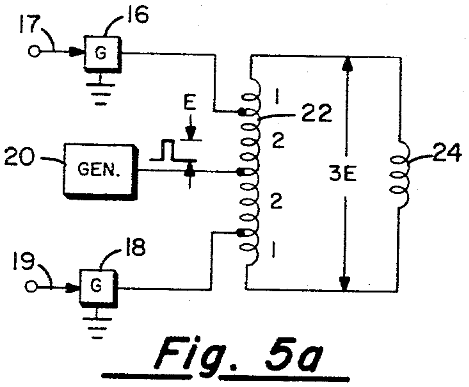
Figure 5B:
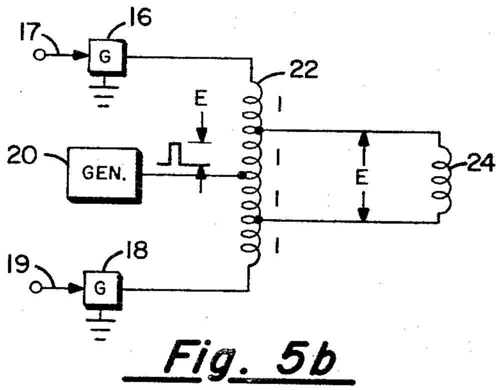
Figure 5C:
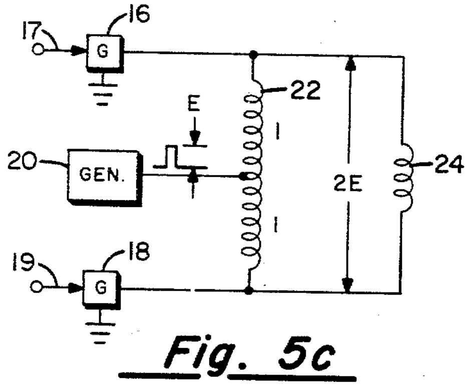

FIGS. 3*a* and 3*b* show waveforms illustrating the necessity of using diodes in the present inventive circuit instead of critically damping the autotransformer;

FIG. 4 shows an alternative embodiment for non-return-to-zero recording;

FIGS. 5*a*, 5*b*, and 5*c* show how varying the transformer taps can vary the voltage across the write-head winding; and FIG. 6 shows the time relationship of the input pulse, the transistor output pulse, and the signal generator output pulse.

Figure 1:
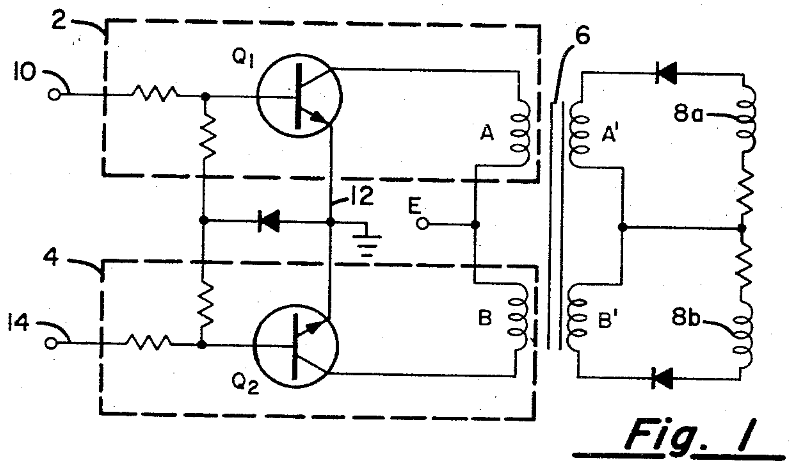
FIG. 1 shows a diagram of a prior art device.

FIG. 1 shows a diagram of a prior art device comprising independent stages 2 and 4, the outputs of which are coupled respectively to the windings **8*a* and 8*b* of the center-tapped write-head winding through the transformer 6. Thus, if a signal representing a "1" is applied on line 10 of stage 2, transistor $Q_1$ conducts and the voltage E, which is applied to the center-tap of the primary windings A and B of transformer 6, causes a current to flow through primary winding A, the collector-emitter circuit of transistor $Q_1$ and ground circuit 12. The current flow through winding A causes a signal to be induced in secondary winding A' which is coupled to write-head winding 8*a*. Similarly, if a signal representing a "0" is applied to line 14 of stage 4, transistor $Q_2$ conducts and causes a signal to be coupled to write-head winding 8*b*. The characteristics of the recorded "1" signals were determined by the characteristics of $Q_1$ and winding A of transformer 6**, and those of the recorded "0" signals by the characteristics of $Q_2$ and winding B. The windings A and B are nearly identical, but the rise-time and fall-time of $Q_1$ and $Q_2$ are nearly certain to vary; hence, the recorded "1" and "0" signals would also vary. Patents such as those of Danielsen, 3,176,156, Klein et al., 3,125,759, and Schoen, 2,900,215 disclose write circuits in which a single winding is used for the write head. However, in all cases, the current to the write-head winding in each direction must flow through a transistor. Since the transistors have rise-times and fall-times which are not identical, the signals which they cause the write-head winding to produce are not identical and perfect erasure does not occur.

Figure 2:
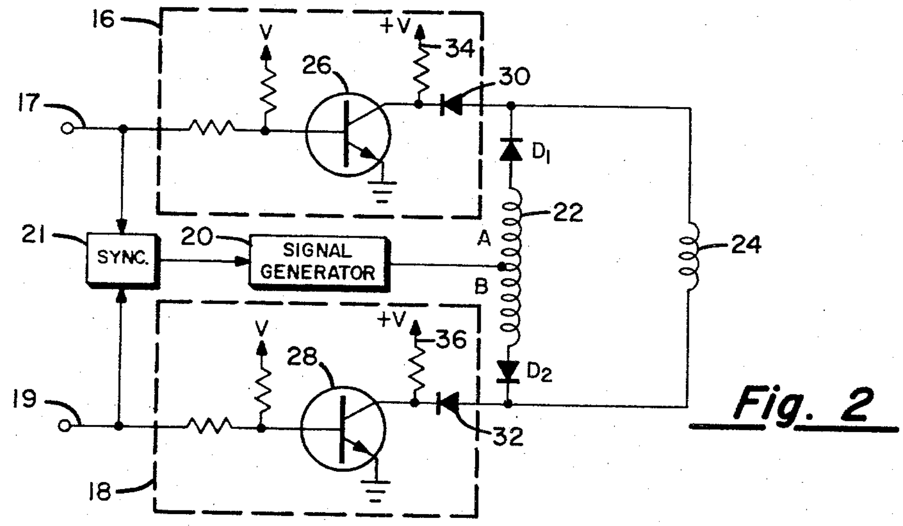
FIG. 2 shows a preferred embodiment of the present invention.

FIG. 2 shows a preferred embodiment of the present invention comprising "1" gate 16, "0" gate 18, signal generator 20, autotransformer 22 and write-head winding 24. The signal generator 20 applied pulses to the center-tap of the autotransformer 22 at a repetition rate equal to the recording rate of the particular device incorporating the amplifier. The output of the synchronizing unit 21 is coupled to generator 20 to cause it to produce output pulses in synchronism with the input pulses on lines 17 and 19. Unit 21 may be any of the well known prior are synchronizing devices which can cause the repetition rate of the output of generator 20 to be synchronized with the input signals. It must be understood that the gating transistors 26 and 28 must have their rise-times stabilized before generator 20 produces an output. Consider FIG. 6. Waveform *a* is the input pulse on either line 17 or 19 to gating circuits 16 and 18 respectively.

Waveform *b* is the output of transistor 26 or 28 produced when waveform *a* causes the appropriate one to switch. Notice the rise-times and fall-times on the leading and lagging edges of waveform *b*. Notice also that waveform *c*, the output of generator 20, occurs in the stable, or steady-state, portion of waveform *b*. Thus, waveform *b* may be, for instance, 300 nanoseconds in width while waveform *c* may be 100 nanoseconds in width. Therefore, it may be seen that varying rise-times and fall-times of the transistors have no adverse influence upon the voltage applied to the write-head winding. The pulses from generator 20 are amplified by windings A and B of autotransformer 22. Gates 16 and 18 provide ground circuits to the windings A and B whenever transistors 26 and 28 conduct. Thus, the waveform produced by winding A will be presented to the write-head winding 24 whenever the transistor 26 in gate 16 is off. In a similar manner, the waveform produced by winding B will be presented to the write-head winding 24 whenever the transistor 28 in gate 18 is off. Thus, it will be understood that whenever gate 16 is off, the current pulse produced by winding A is conducted through diode $D_1$, write-head winding 24 and gate 18 to ground. Likewise, whenever gate 18 is off, the current pulse produced by winding B is conducted through diode $D_2$, write-head winding 24 and gate 16 to ground. It will be seen then that the current is conducted first in one direction through write-head winding 24 and then in the other direction.

By design, the characteristics of windings A and B are as nearly identical as possible. Therefore, the signals produced at the write-head winding 24 are of opposite polarity but otherwise essentially identical. Thus, selection of the waveform presented to the write-head winding 24 is accomplished by the logic forming the gates 16 and 18. The input logic is designed to encode the data to be recorded and turn off either gate 16 or gate 18 depending upon whether the data is a "1" or a "0." The rise-times and fall-times of the "0" and "1" signals are identical since both signals originate from a common signal generator. In addition, the signals are amplified by nearly identical windings in the autotransformer. These signals, when presented to opposite sides of the write-head winding 24, produces "0" and "1" signals which are nearly perfect mirror images. Consequently, writing one signal over the other effects a nearly perfect erasure.

It will also be seen that the input signal generator 20 is DC coupled to the write-head winding 24. Thus, for the same magnitude of input signal, the signal seen by the write-head winding will be greater in the present circuit than in the prior art, i.e., the amplified signal now consists of AC and DC components whereas previously it consisted of only an AC component.

FIG. 3 shows waveforms illustrating the necessity of using diodes in the present inventive circuit instead of critically damping the autotransformer. Diodes $D_1$ and $D_2$ serve as a means for preventing the backswing voltage of the autotransformer from appearing across the write-head winding. The advantage of using diodes rather than critically damping the transformer is illustrated by the critically damped and undamped transformer waveforms of FIG. 3*a* and FIG. 3*b* respectively. Consider the critically damped case shown in FIG. 3*a*. After several successive pulses, the base line shifts and the negative portion of the shifted waveforms partially erase the recorded signal. If the pulses continued indefinitely, complete erasure would occur since the negative and positive pulses would be equal. In order to avoid this situation, the transformer is left undamped and it produces the waveform shown in FIG. 3*b*. There is then no tendency for the base line to shift since the positive and negative portions of the waveform are equal in area. Diodes $D_1$ and $D_2$ block the backswing voltage portion of the waveform. Thus, only the positive portion of the waveforms is presented to the write-head winding.

When modified non-return-to-zero (NRZ) recording techniques are used such as phase-modulation, double-frequency, double-pulse return-to-zero, etc., the blocking diodes $D_1$ and $D_2$ can be eliminated. This is the case because in any of the above techniques, the positive pulses equal the negative pulses in area. Whenever this happens, there is a balance about the base line and it does not tend to shift. When the blocking diodes are eliminated, the turns-ratio of the autotransformer can be varied at will without changing the base line by changing either the gate or write-head winding interconnection points. A possible circuit of NRZ recording with a 4:1 turns ratio is shown in FIG. 4. Like components are numbered as in FIG. 2. Since the turns ratio can now be varied without changing the base line, the voltage and current delivered to the head can be adjusted as needed. It is obvious that other ratios can be obtained as shown in FIGS. 5*a*, 5*b*, and 5*c*.

Diodes 30 and 32 in gates 16 and 18 respectively are used to aid cut-off of transistors 26 and 28 because of their fast recovery time. Also, if a head switching circuit as shown in Patents 2,877,451 and 3,105,224 is inserted in parallel with writing-head winding 24, diodes 30 and 32 prevent voltage supplies 34 and 36 from interfering with the switching circuit.

It can be seen that initially, both transistors 26 and 28 may be off, both may be on or they may be in either states with the output of the signal generator 20 passing through a switch (not shown) which may be open initially and closed when it is desired to operate the circuit.

It is understood that suitable modifications may be made in the structure as disclosed provided such modifications come within the spirit and scope of the appended claims. Having now, therefore, fully illustrated and described my invention, what I claim to be new and desire to protect by Letters Patent is set forth in the appended claims.

What is claimed is:

1. A magnetic recording circuit for receiving input information signals representative of a logical "1" or a logical "0" to be recorded and for producing first and second currents through a write-head winding, which are identical but of opposite polarity, said circuit comprising:

(a) an autotransformer having a plurality of taps including a center-tap, means for receiving timed current pulses of equal amplitude and duration, (b) a write-head winding D.C. coupled between two of said taps, said two taps on opposite sides of said center-tap means, on said autotransformer for alternatively providing signals of said opposite polarity, said polarity dependent on the direction of current flow therethrough, a first polarity indicative of an input logical "1" and a second indicative of an input logical "0," and (c) switching means coupled to selected ones of said autotransformer taps, said switching means including input means for receiving information signals alternatively indicative of said input logical "1" and logical "0" signals, and further including output means for producing output signals which cause said write-head winding to provide said signals of opposite polarity, said timed current pulses occurring only when said output signals have reached substantially steady state amplitude.

2. The circuit of claim 1 wherein said switching means coupled to selected ones of said autotransformer taps includes:

(a) a first transistor having one electrode coupled to a first one of said selected taps, a second electrode for receiving a potential, and a third electrode for receiving said logical "1" information signal whereby said first tap is connected to said potential when said logical "1" is received, (b) a second transistor having one electrode coupled to a second one of said selected taps, a second electrode for receiving said potential, and a third electrode for receiving said logical "0" information signal whereby said second selected taps is connected to said potential when said logical "0" is received, and (c) means for coupling said first and second transistor circuits to a source of transistor bias and drive voltages.

3. The circuit of claim 2 further including:

(a) a first isolation means coupled between said one electrode of said first transistor and said first one of said selected taps for isolating said write-head winding from said source of transistor drive voltage, and (b) a second isolation means coupled between said one electrode of said second transistor and said second one of said selected taps isolating said write-head winding from said source of transistor drive voltage.

4. The circuit of claim 3 wherein:

(a) said first and second isolation means are unilateral conducting diodes.

5. The circuit of claim 4 further including:

(a) a signal generator means coupled to said transformer center-tap for producing said timed current pulses of equal amplitude and duration, and (b) synchronizing means for receiving said information signals representative of said logical "1" and said logical "0," said synchronizing means connected to said signal generator means for causing said timed current pulses to occur only when said output signals have reached substantially steady state amplitude.

6. The circuit of claim 2 further including:

(a) a first pair of diodes serially connected between said first one of said selected taps of said autotransformer and said one electrode of said first transistor, (b) a second pair of diodes serially connected between said second one of said selected taps of said autotransformer and said one electrode of said second transistor, and (c) means for connecting said write-head winding between the junction of said first pair of diodes and the junction of said second pair of diodes.

7. The circuit of claim 6 further including:

(a) a signal generator means for producing said timed current pulses of equal amplitude and duration, and (b) synchronizing means for receiving said information signals representative of said logical "1" and said logical "0," said synchronizing means connected to said signal generator means for causing said current pulses to occur only when said output signals have reached substantially steady state amplitude.

References Cited

UNITED STATES PATENTS

| | | | |
|---|---|---|---|
| 2,877,451 | 3/1959 | Williams | 340—174.1 |
| 2,891,236 | 6/1959 | Eisenberg | 340—174.1 |
| 3,188,616 | 6/1965 | Simon | 346—74 |

BERNARD KONICK, *Primary Examiner.*

LEE J. SCHROEDER, *Assistant Examiner.*

U.S. Cl. X.R.

307—270, 282; 340—174.1